US012659706B2

(12) United States Patent
Kwak et al.

(10) Patent No.: US 12,659,706 B2
(45) Date of Patent: Jun. 16, 2026

(54) METHOD BY WHICH DEVICE TRANSMITS AND RECEIVES CPM IN WIRELESS COMMUNICATION SYSTEM FOR SUPPORTING SIDELINK, DEVICE AND CHIPSET THEREFOR

(71) Applicant: LG Electronics Inc., Seoul (KR)

(72) Inventors: Minsung Kwak, Seoul (KR);
Seungryul Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 607 days.

(21) Appl. No.: 17/627,396

(22) PCT Filed: Aug. 24, 2020

(86) PCT No.: PCT/KR2020/011250
§ 371 (c)(1),
(2) Date: Jan. 14, 2022

(87) PCT Pub. No.: WO2021/040352
PCT Pub. Date: Mar. 4, 2021

(65) Prior Publication Data
US 2022/0264265 A1    Aug. 18, 2022

(30) Foreign Application Priority Data
Aug. 23, 2019    (KR) ........................ 10-2019-0103395

(51) Int. Cl.
*H04W 4/38*        (2018.01)
*G01S 5/00*        (2006.01)
(Continued)

(52) U.S. Cl.
CPC ............. *H04W 4/38* (2018.02); *G01S 5/0072* (2013.01); *H04W 4/12* (2013.01); *H04W 4/40* (2018.02)

(58) Field of Classification Search
CPC ........... H04W 4/38; H04W 4/12; H04W 4/40; H04W 4/027; H04W 4/023; H04W 84/005; H04W 4/46; H04W 92/18; G01S 5/0072
See application file for complete search history.

(56) References Cited

U.S. PATENT DOCUMENTS 11,475,764 B2 * 10/2022 Tijink ..................... H04W 4/40
2018/0322782 A1 * 11/2018 Engel ..................... G08G 1/163
(Continued)

FOREIGN PATENT DOCUMENTS

EP        3462754        4/2019
WO    WO2018128946        7/2018

OTHER PUBLICATIONS

International Search Report in International Appln. No. PCT/KR2020/011250, dated Dec. 3, 2020, 5 pages (with English translation).

*Primary Examiner* — Joseph E Avellino
*Assistant Examiner* — Adam Joel Cerlanek
(74) *Attorney, Agent, or Firm* — Fish & Richardson P.C.

(57) ABSTRACT

Disclosed in various embodiments are a method by which a first device transmits a collective perception message (CPM) in a wireless communication system, and a device therefor. Disclosed are a method by which a first device transmits a collective perception message (CPM) in a wireless communication system, and a device therefor, the method comprising the steps of: receiving a first message from a second device; acquiring sensing information about adjacent objects; and transmitting the CPM on the basis of the sensing information, wherein the first device determines whether object information that overlaps with first object information acquired from the first message is included in the sensing information, and determines whether to include the over- (Continued)

lapping object information in the CPM on the basis of the distance to the second device.

10 Claims, 23 Drawing Sheets

(51) Int. Cl.
 *H04W 4/12* (2009.01)
 *H04W 4/40* (2018.01)

(56) References Cited

U.S. PATENT DOCUMENTS

| | | | |
|---|---|---|---|
| 2018/0365909 A1* | 12/2018 | Cheng | H04Q 9/00 |
| 2019/0051151 A1 | 2/2019 | Mueck et al. | |
| 2019/0098088 A1 | 3/2019 | Baltar et al. | |
| 2022/0005353 A1* | 1/2022 | Hwang | H04W 4/40 |
| 2022/0103986 A1* | 3/2022 | Hwang | H04W 4/44 |

\* cited by examiner

PU5-U (a)

PU5-U (b)

BS (e.g. eNB or gNB)

단말 1                                              단말 2

(a)

(b)

CAM Information
- generation Time =
2019-08-01T00:00:34:000Z
- heading = 40
- curvature = 500
- speed = 40km/h
- acceleration = -3m/s²
- reference position = x1, y1, z1
. . .

Sensing Information
- Sensing Time =
2019-08-01T00:00:36:000Z
- Sensing heading = 85
- Sensing speed = 30km/h
- Sensing position = x2, y2, z2
. . .

(b)

(a)

CPM Information
- generation Time =
  2019-08-01T00:00:34:000Z
- StationInformation
  - heading = 90
  - reference position = x1, y1, z1
  ...
- Perceived Object
  - objectID : B1
  - xDistance : 5
  - yDistance : 5
  - zDistance : 0
  ...

Sensing Information
- Sensing Time =
  2019-08-01T00:00:36:000Z
- Sensing heading = 85
- Sensing speed = 30km/h
- Sensing position = s2, y2, z2
  ...

METHOD BY WHICH DEVICE TRANSMITS AND RECEIVES CPM IN WIRELESS COMMUNICATION SYSTEM FOR SUPPORTING SIDELINK, DEVICE AND CHIPSET THEREFOR

CROSS-REFERENCE TO RELATED APPLICATIONS

This application is a National Stage application under 35 U.S.C. § 371 of International Application No. PCT/KR2020/011250, filed on Aug. 24, 2020, which claims the benefit of Korean Application No. 10-2019-0103395, filed on Aug. 23, 2019. The disclosures of the prior applications are incorporated by reference in their entirety.

TECHNICAL FIELD

Embodiments of the present disclosure relate to a method for transmitting and receiving a collective perception message (CPM) by a device in a wireless communication system supporting sidelink, and a device for the same, and more particularly to a method for determining object information to be included in the CPM based on a message received from another device and signals sensed by sensors, and then transmitting the CPM, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and a device for constructing the collective perception message (CPM) in a manner that information about an overlapping object (or a duplicate object) is not included in the CPM when the CPM received by a first device is highly likely to be received by other adjacent objects, so that overlapping object information can be prevented from being transferred to a adjacent intelligent transport system (ITS) station, the amount of information of the CPM received by the first device can be optimized, and the amount of unnecessary network traffic increase can be minimized. In addition, when the received CPM is less likely to be received by other adjacent objects, the above-described method and device according to the present disclosure can allow the CPM to include information about the duplication object, resulting in an increased coverage of the received CPM related to the overlapping object.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with an aspect of the present disclosure, a method for transmitting a collective perception message (CPM) by a first device in a wireless communication system supporting sidelink includes receiving a first message from a second device; obtaining sensing information about adjacent objects, and transmitting the CPM based on the sensing information. The first device determines whether object information overlapping first object information obtained from the first message is included in the sensing information, and determines whether to include the overlapped object information in the CPM based on a distance to the second device.

If the distance to the second device is less than a preconfigured threshold distance, the CPM may be configured to include object information other than information about the overlapping object from among the adjacent objects.

If the distance to the second device exceeds a preconfigured threshold distance, the CPM may be configured to include the overlapping object information.

The preconfigured threshold distance may be pre-configured based on a coverage of the first message.

The overlapping object information may be information about an object located within a predetermined error distance from a position of the first object obtained based on the first message, from among adjacent objects included in the sensing information.

The position of the first object may be estimated, based on mobility information obtained from the first message and a difference between a first time obtained from the first message and a second time where the sensing information is obtained.

The first time may be obtained based on a timestamp included in the first message.

The overlapping object information may be determined not only based on type, size, position, and mobility information of the object or the second device, that are obtained from the first message, but also based on type, size, position, and mobility information of the object, that are obtained from the sensing information.

The first message may be a cooperative awareness message (CAM) received from the second device or may be the collective perception message (CPM).

The pre-configured threshold distance may be adjusted based on a moving speed of the second device included in the first message and a moving speed of the first device.

The object information may be information about either a vehicle or an intelligent transport system (ITS) station.

In accordance with another aspect of the present disclosure, a first device configured to transmit a collective perception message (CPM) in a wireless communication system supporting sidelink includes a radio frequency (RF) transceiver; and a processor connected to the RF transceiver. The processor is configured to receive a first message from a second device by controlling the RF transceiver, obtain sensing information about adjacent objects, determine whether object information overlapping first object information obtained from the first message is included in the sensing information, determine whether to include the overlapping object information in the CPM based on a distance to the second device, and transmit the CPM based on the sensing information by controlling the RF transceiver.

In accordance with another aspect of the present disclosure, a chip set configured to transmit a collective perception message (CPM) in a wireless communication system supporting sidelink includes at least one processor; and at least one memory operatively connected to the at least one processor, and configured to store instructions such that the at least one processor performs specific operations by executing the instructions. The specific operations include receiving a first message from a second device, obtaining sensing information about adjacent objects, determining whether object information overlapping first object information obtained from the first message is included in the sensing information, determining whether to include the overlapping object information in the CPM based on a distance to the second device, and transmitting the CPM based on the sensing information.

The processor may be configured to control a driving mode of a device connected to the chip set, based on the CPM.

In accordance with another aspect of the present disclosure, a computer-readable storage medium configured to store at least one computer program including instructions such that at least one processor for use in a wireless communication system supporting sidelink performs specific operations of transmitting a collective perception message (CPM) by executing the instructions may include at least one computer program for allowing the at least one processor to perform an operation of transmitting the collective perception message (CPM), and a computer-readable storage medium configured to store the at least one computer storage. The specific operations include receiving a first message from a second device, obtaining sensing information about adjacent objects, determining whether object information overlapping first object information obtained from the first message is included in the sensing information, determining whether to include the overlapping object information in the CPM based on a distance to the second device, and transmitting the collective perception message (CPM) based on the sensing information.

Advantageous Effects

Various embodiments of the present disclosure can construct the collective perception message (CPM) in a manner that information about an overlapping object is not included in the CPM when the CPM received by the first device is highly likely to be received by other adjacent objects, so that overlapping object information can be prevented from being transferred to a adjacent intelligent transport system (ITS) station, the amount of information of the CPM received by the first device can be optimized, and the amount of unnecessary network traffic increase can be minimized. In addition, when the received CPM is less likely to be received by other adjacent objects, the above-described embodiments can allow the CPM to include information about the duplication object, resulting in an increased coverage of the received CPM related to the overlapping object.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
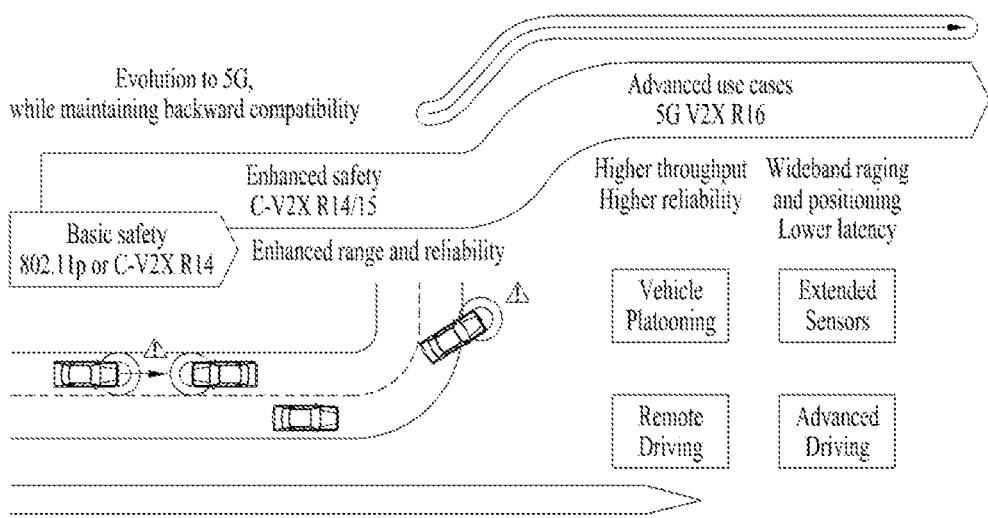
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (WI-FI™), IEEE 802.16 (WIMAX™), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
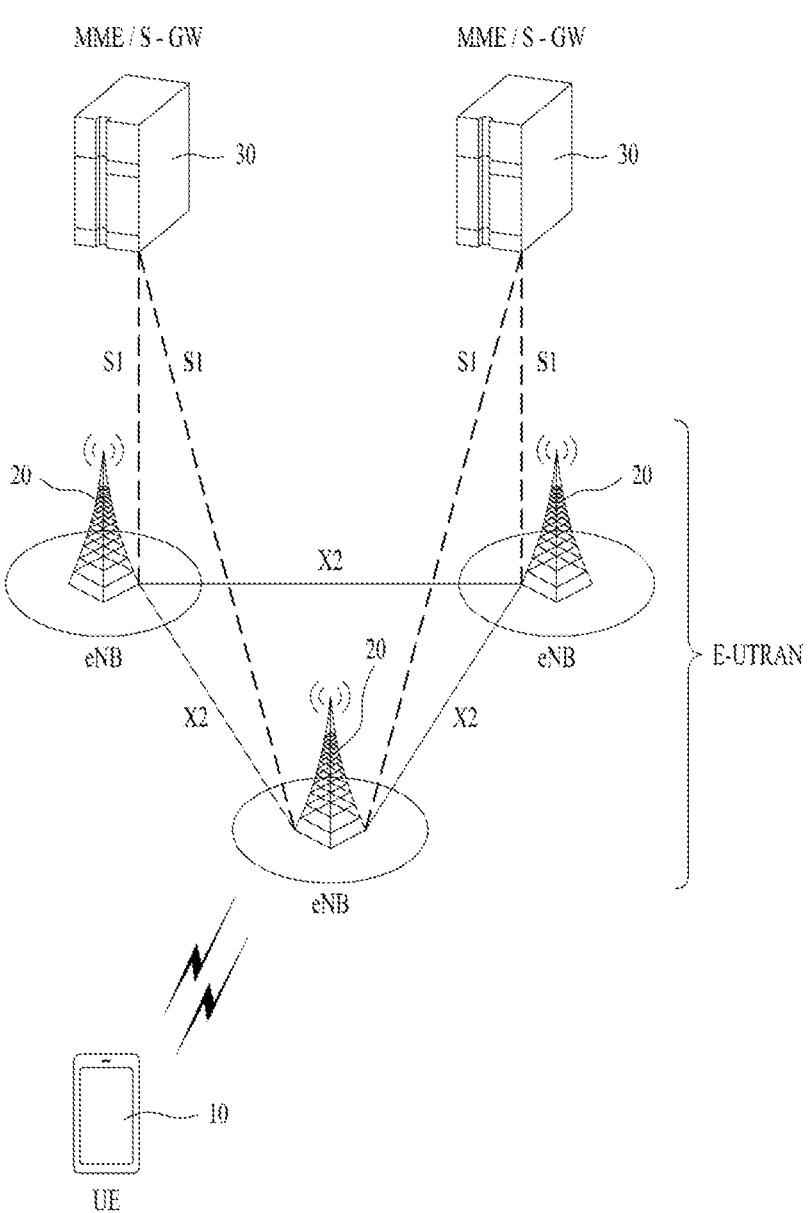
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
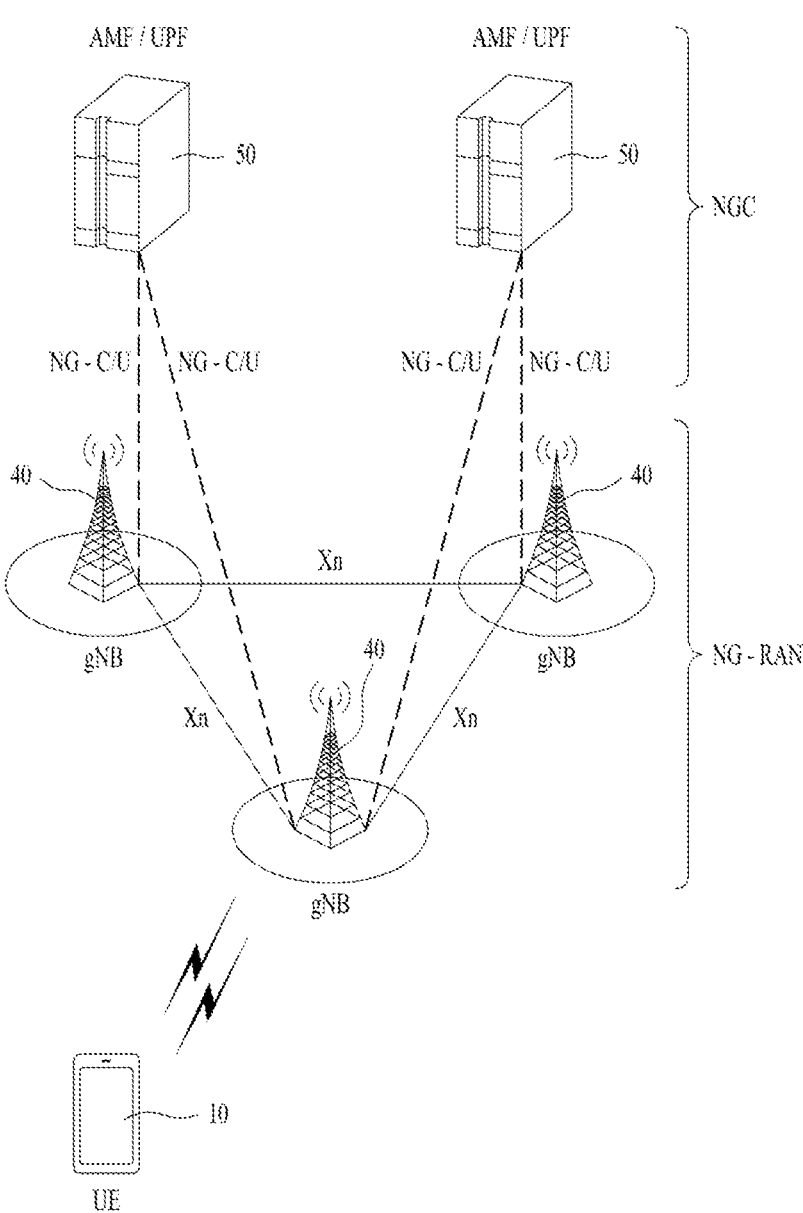
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
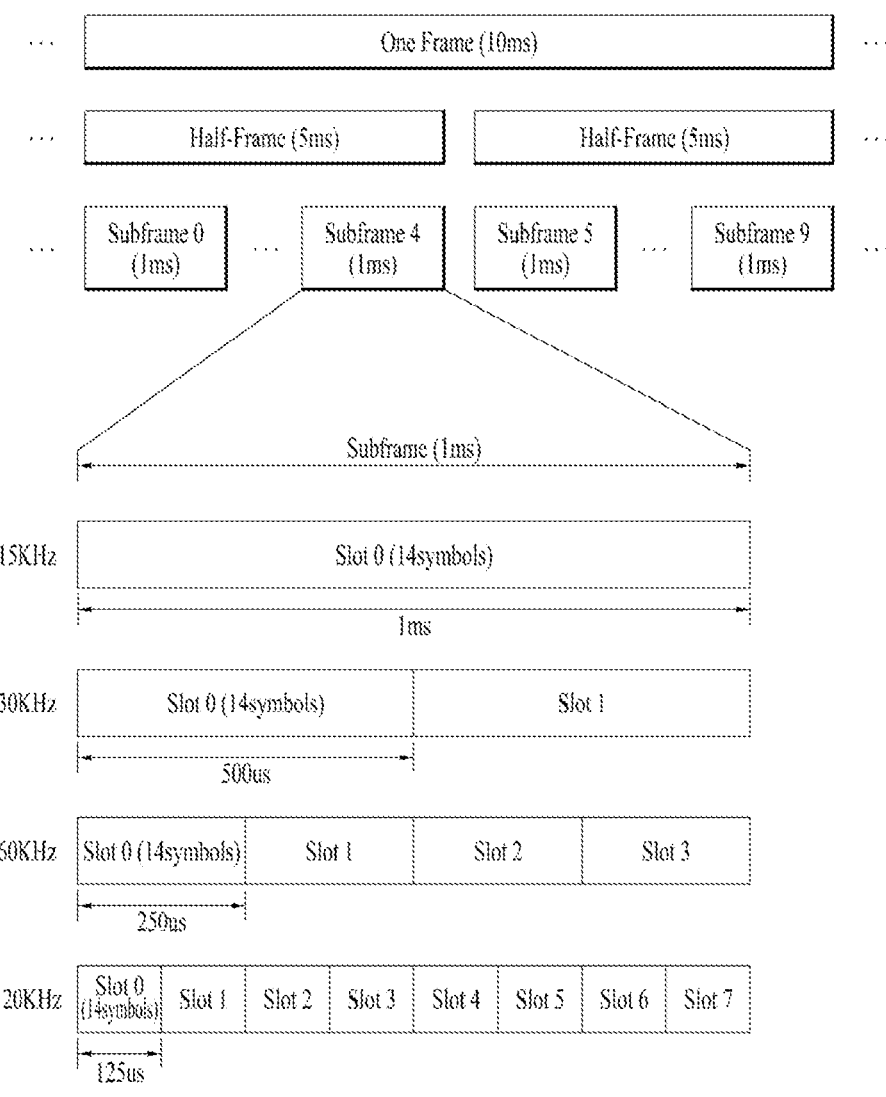
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

US 12,659,706 B2

9

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
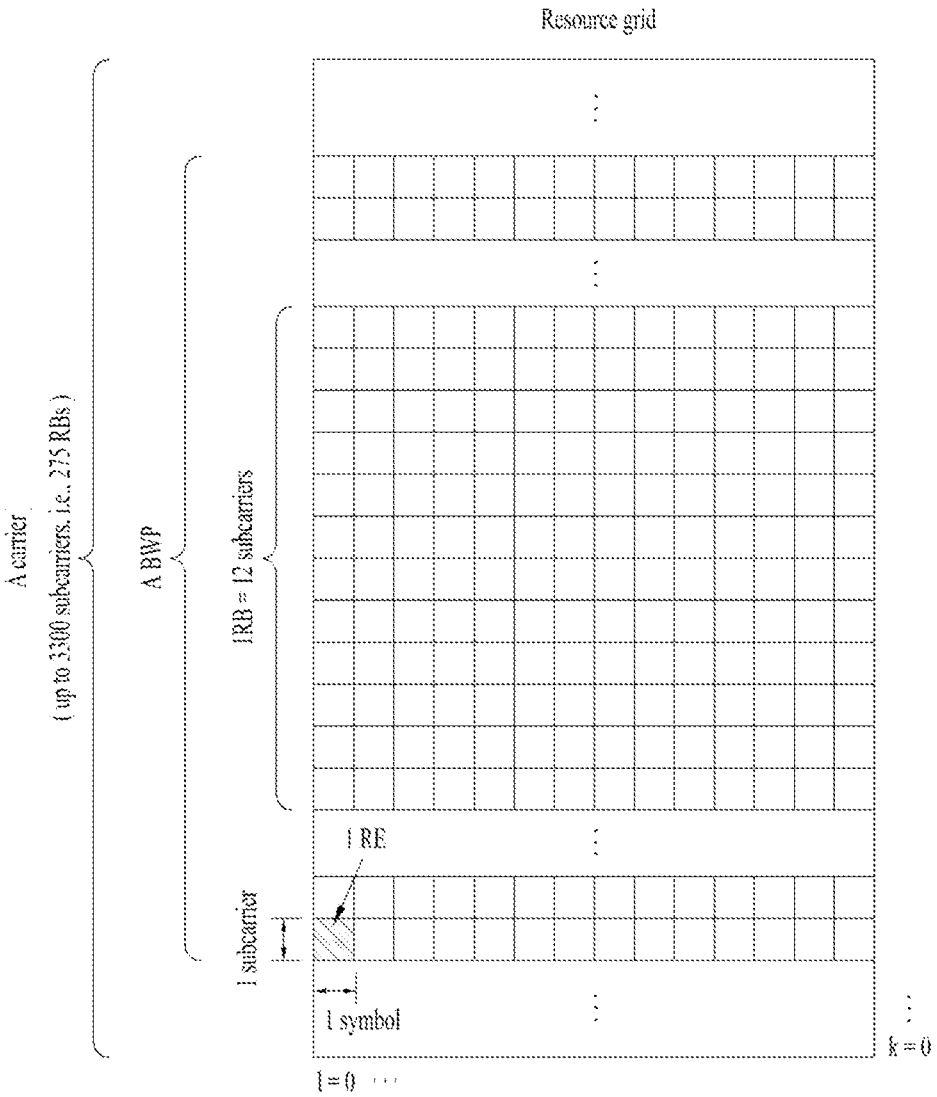
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
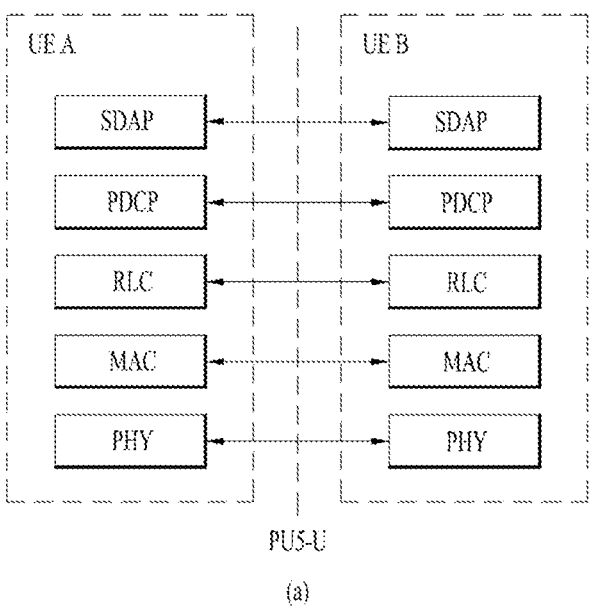
FIG. 6 illustrates a radio protocol architecture for SL communication.
Figure 6:
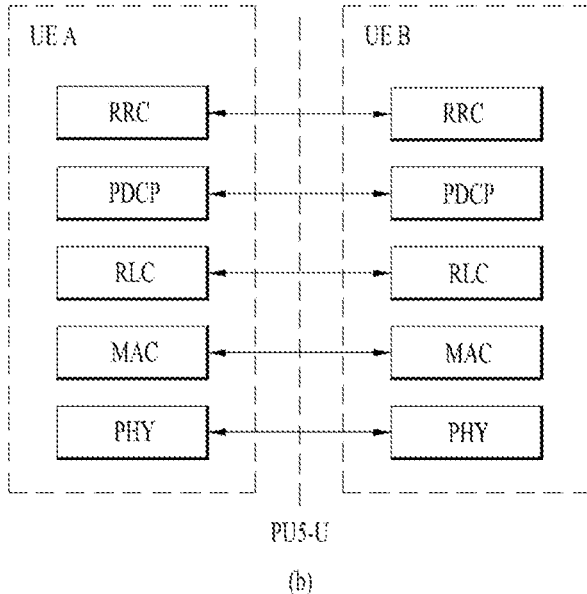

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the S-SSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
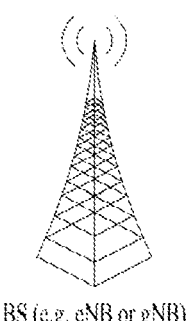
FIG. 7 illustrates UEs performing V2X or SL communication.
Figure 7:
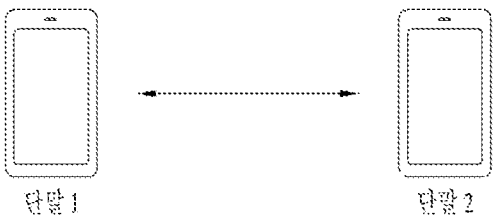

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
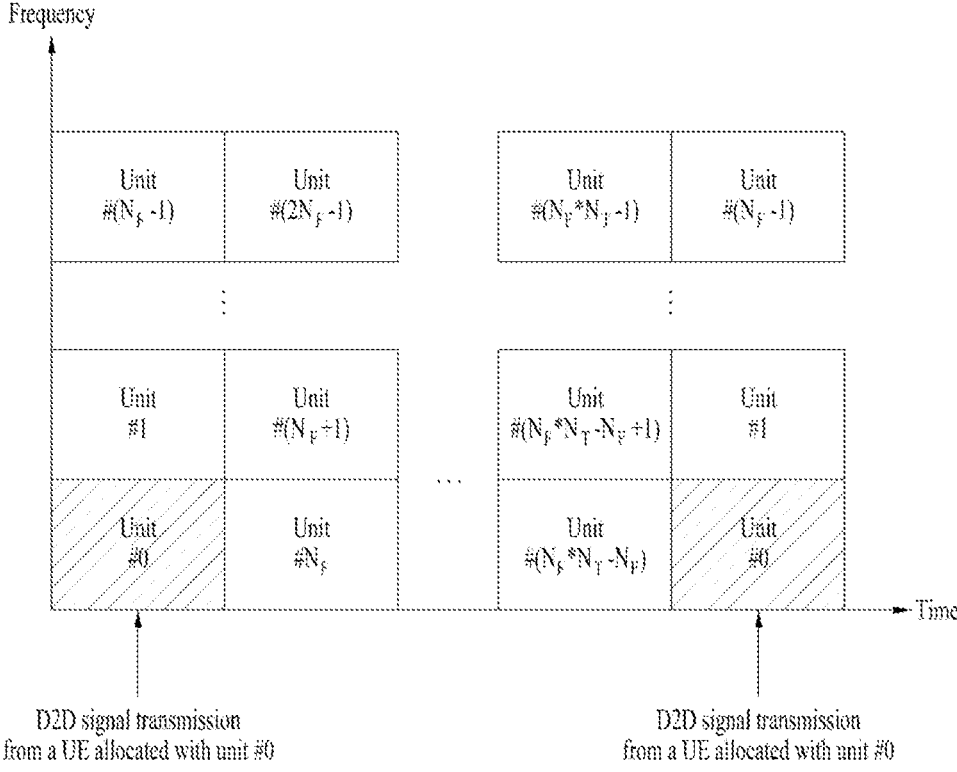
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
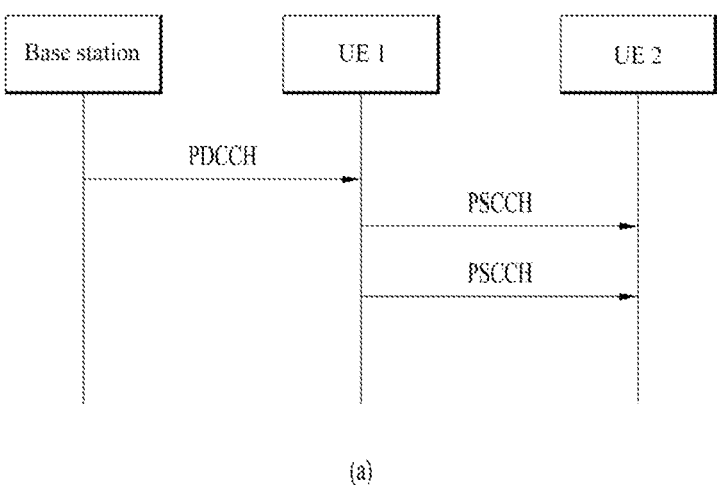
FIG. 9 illustrates a procedure in which UEs perform V2X or SL communication according to a transmission mode.
Figure 9:
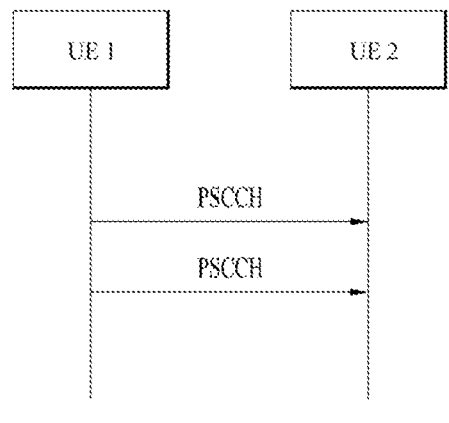

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1 \geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

Generally, for the purpose of overcoming the pathloss problem when using a very high frequency such as mmWave, beamforming may be used. In order to use such beamforming, the best beam pair should be detected from among several beam pairs between a transmitter and a receiver. From the viewpoint of the receiver, the above-mentioned process may be referred to as a beam acquisition process or a beam tracking process. In particular, since analog beamforming is used in mmWave, the vehicle needs to perform beam sweeping that performs beam switching in different directions at different time points using an antenna array of the vehicle in the beam acquisition or beam tracking process.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 10:
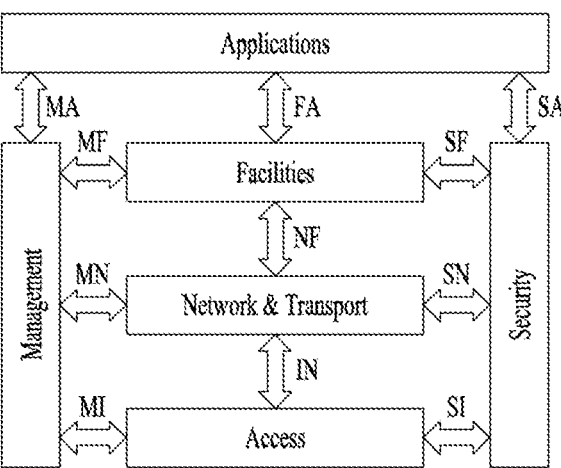
FIG. 10 is a diagram for explaining an ITS station reference architecture.

FIG. 10 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Figure 11:
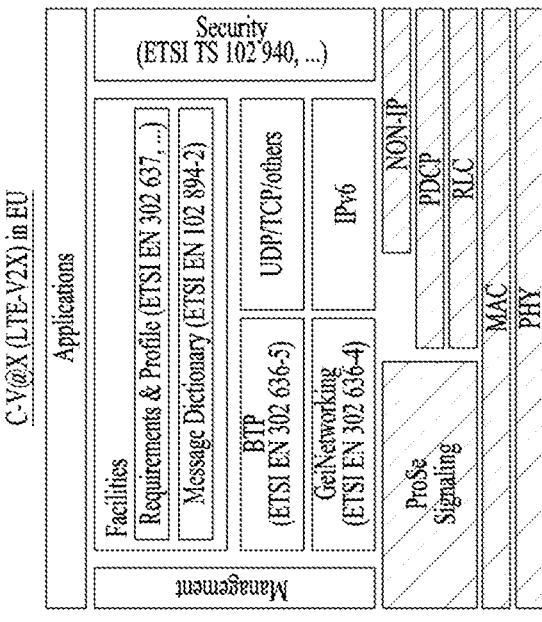
FIG. 11 illustrates an exemplary structure of an ITS station that may be designed and applied based on a reference architecture.

Specifically, features of the ITS station reference architecture based on the OSI model are illustrated in FIG. 11. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

FIG. 11 illustrates an exemplary structure of an ITS station that may be designed and applied based on a reference architecture.

A main concept of the ITS station reference architecture is to allow each layer with a special function to process communication on a layer basis, between two end vehicles/ users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/ infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

CPS (Collective Perception Service) Overlapping Object Minimization

Figure 12:
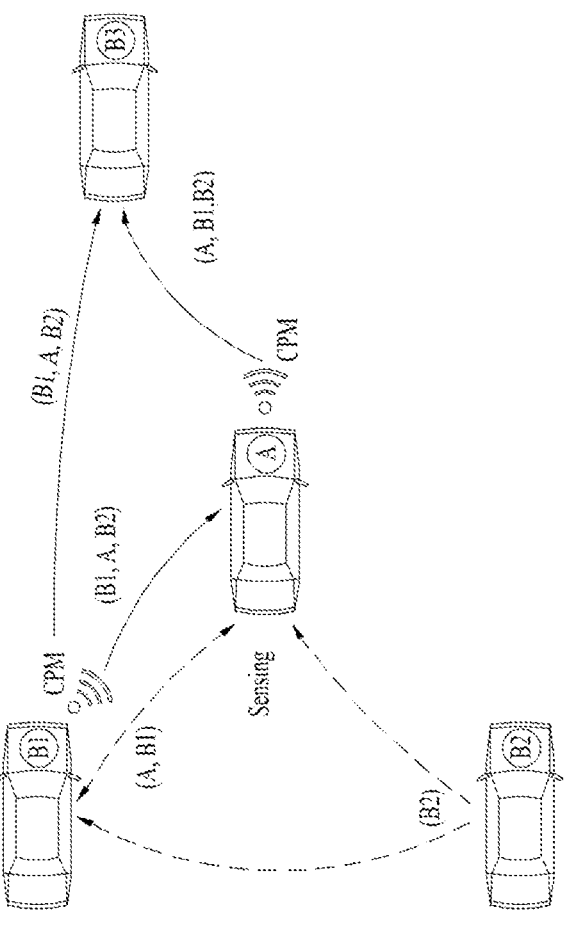
FIG. 12 is a diagram illustrating a method for exchanging a collective perception message (CPM) between the intelligent transport system (ITS) stations.

FIG. 12 is a diagram illustrating a method for exchanging a collective perception message (CPM) between the intelligent transport system (ITS) stations.

A Collective Perception Service (CPS) is a service for transmitting, to adjacent ITS station(s), the CPM that is configured based on the object information sensed by sensors of the ITS station (or ITS-station) equipped with the sensors. The adjacent ITS station may obtain information about an object that was not directly recognized based on the received CPM. However, the CPS has disadvantages in that the object information constructing the CPM can be transmitted in a duplicate manner.

Referring to FIG. 12, when each of a vehicle B1 (or a second ITS station) and a vehicle A (or a first ITS station) can transmit the CPM (and/or CAM), the third ITS station (or Vehicle B2) can be sensed by sensors of the second ITS station B1 and sensors of the first ITS station A. In this case, the CPM of the second ITS station and the CPM of the first ITS station, that are transferred to the fourth ITS station (or Vehicle B3), may cause duplicate transmission of the sensing information about the third ITS station, so that such duplicate transmission may increase unnecessary network traffic.

Specifically, the first ITS station (A) may sense the object (or adjacent vehicles) configured to transmit the CAM and/or CPM (when information about the first ITS station (A) is transmitted through the CAM and/or CPM). In this case, the first ITS station (A) needs to determine whether the sensed object is identical to the object recognized through the CAM (and/or CPM). In other words, if information about the object B that is recognized by the first ITS station (A) through the sensors (e.g., a camera, Lidar, Radar, etc.) is significantly similar to information about the object (C) that is recognized through the CAM received by the first ITS station (A), the first ITS station (A) should define a determination criterion for recognizing that the object B and the object C are the same overlapping objects.

A method for allowing the first ITS station (A) to determine the identity between one object information that was recognized or acquired by the received CAM and/or CPM and the other object information that was acquired from the sensors, and/or a method for configuring the CPM based on the determined identity will hereinafter be described with reference to the attached drawings. On the other hand, the following description will disclose one embodiment for determining the overlapping object based on the received CAM and the other embodiment for determining the overlapping object based on the received CPM in different ways for convenience of description, but both the received CPM and the received CAM can also be considered in determining whether the corresponding object is the same as the object sensed by sensors (or in determining the identity between the corresponding object and the sensed object) as necessary.

First, a method for allowing the first ITS station (A) to determine the identity between one object recognized through the received CAM and the sensing object sensed by the sensors, and configuring the CPM when the overlapping object is sensed and recognized will hereinafter be described.

The first ITS station (A) may compare information of the received CAM (or a reception CAM) with the sensing information to determine whether the sensing object C is identical to the object B recognized by the reception CAM. For example, the first ITS station (A) may acquire information about the type, size, motion, and location, etc. of the object (or the ITS station) from the reception CAM. In this case, the first ITS station (A) may determine whether object information acquired from the reception CAM is identical to the other object information (or ITS station information) such as type, size, motion, location, etc. acquired by the sensors, may determine whether one object information and the other object information are identical to each other within a specific error range, and may thus determine whether the sensing object are the recognition object are identical to each other (i.e., the overlapping objects) based on the above-mentioned results of determination.

Alternatively, the first ITS station (A) may determine whether the object (or the sensing object) sensed by the sensor and the other object (or the recognition object) recognized from the received CAM are identical to each other by referring to location information only. In other words, when the identity between object's position information (or position information of the recognition object) received through the CAM and the other object's position information recognized by the sensor is confirmed within a specific error range, the first ITS station (A) may determine that the sensing object and the recognition object serve as the overlapping objects. For example, if a difference in position between the recognition object and the sensing object is 1 m or less, this means that the recognition object and the sensing object are identical to each other.

Alternatively, if a difference in position between the recognition object and the sensing object is less than a predetermined error distance (e.g., 1 m), it can be estimated that the recognition object and the sensing object are the overlapping objects even if information of the recognition object is somewhat different from information of the sensing object. This is because the purpose of services caused by the CPS can be sufficiently achieved by the first ITS station (A) even when objects present within a predetermined error distance are treated as information of only one object.

A method for comparing the position information of the sensing object with the position information of the recognition object recognized by the CAM will hereinafter be described with reference to the attached drawings.

Figure 13:
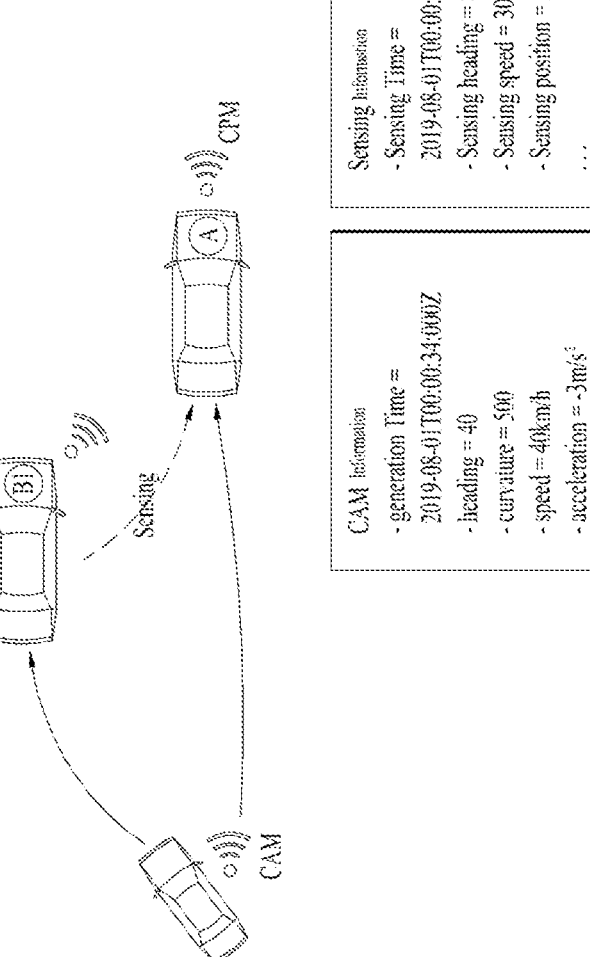
FIG. 13 is a diagram illustrating a method for comparing position information of a sensing object with position information of a recognition object recognized by a cooperative awareness message (CAM).

FIG. 13 is a diagram illustrating a method for comparing position information of the sensing object with position information of the recognition object recognized by a cooperative awareness message (CAM).

Referring to FIG. 13, as a method for comparing the positions of objects with each other, the first ITS station (A) may estimate the positions of such objects located at the same time point in consideration of a time difference between timestamp information of the reception CAM and the sensing time point, and may thus compare and determine the positions of objects using dynamics and kinetic information of the reception CAM. In other words, the first ITS station (A) may estimate the position information of the recognition object at a time point where the sensing object is sensed in consideration of a time difference between timestamp information of the reception CAM and the sensing time point, and may determine whether the estimated position information of the recognition object and the position information of the sensing object are within a predetermined error distance.

Specifically, the first object B1 (or Vehicle B1) may periodically transmit the CAM generated while in motion, and the first ITS station (A) may configure the CPM based on the sensing information obtained from the sensor mounted to the first ITS station (A) and transmit the configured CPM. For example, upon receiving the CAM from the first object (B1), the first ITS station (A) may acquire position information of the first object at a specific time (e.g., 0:0:34) based on 'generationDeltaTime' of the reception CAM, and may sense position information of the first object at a different time (e.g., 0:0:36) from the specific time through the sensor. In this case, when the object has moved from a specific position (x1, y1, z1) to a certain position during 2 seconds, the first ITS station (A) may estimate the certain position where the object is currently located based on movement information (e.g., speed, movement direction, and position information) of the CAM. When a difference between the position of the first object according to the estimated position information and the sensed position (x2, y2, z2) is within a specific error range, the first ITS station (A) may determine that the first object (B1) recognized by the CAM and the first object (B1) corresponding to the sensing object are the same objects (i.e., the overlapping objects).

When the identity between the recognition object and the sensing object is confirmed according to the above-described methods (or when the recognition object and the sensing object are determined to be the overlapping objects), the first ITS station (A) may construct the CPM in different ways according to the following configuration methods.

In the first configuration method, although the recognition object and the sensing object are identical to each other (i.e., the overlapping objects), information about the sensing object (or information about the overlapping object) identical to the recognition object is forcibly included in the CPM by the first ITS station (A), so that the resultant CPM can be configured and transmitted by the first ITS station (A). In this case, overlap (or duplication) between the object information included in the reception CAM of another object and the object information included in the CPM of the first ITS station (A) may occur. Furthermore, the above-described method need not compare and determine whether the recognition object is identical to the sensing object.

In the second configuration method, the first ITS station (A) may not forcibly include, in the CPM, information about the sensing object (or information about the overlapping object) identical to the recognition object. In this case, overlap between object information included in the reception CAM of another object and object information included in the CPM of the first ITS station (A) can be completely eliminated. However, the adjacent ITS station that has not yet received the CAM of the other object may not receive information about the other object even when using the CPM of the first ITS station (A).

In a third case indicating a third configuration method, the first ITS station (A) may determine whether to include information about the object (B) in the CPM based on the distance between the first ITS station (A) and the overlapping object (B). Specifically, when the distance between the first ITS station (A) and the object (B) is within a threshold distance, the first ITS station (A) cannot obtain any gain caused by the overlapping object information, so that the first ITS station (A) can configure the CPM in a manner that information about the object (B) is not included in the CPM. In other words, when the distance between the first ITS station (A) and the object (B) is within a specific distance, there is a high possibility that the adjacent ITS station can recognize the object (B) based on the CAM transferred from the object (B), so that the adjacent ITS station can obtain information about the object (B) even when the first ITS station (A) excludes information of the overlapping object from the CPM.

Alternatively, when the distance between the first ITS station (A) and the object (B) is equal to or longer than a threshold distance, the first ITS station (A) may include, in the CPM, information about the overlapping object (B), so that coverage of the information about the object (B) can increase. In other words, when the distance between the first ITS station (A) and the object (B) is equal to or longer than a threshold distance, transmission of the CPM including information of the object (B) may be advantages in terms of coverage extension (or coverage extension of the CAM of the object B) of transmission of information about the object (B) rather than duplication transmission of information about the object (B). Accordingly, the adjacent ITS station not receiving the CAM from the object (B) may obtain information about the object (B) through the CPM.

Figure 14:
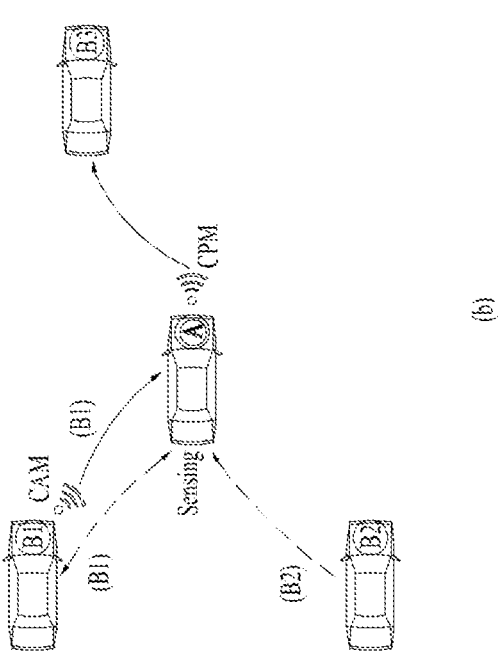
FIG. 14 is a diagram illustrating a method for constructing the CPM by a first ITS station.
Figure 14:
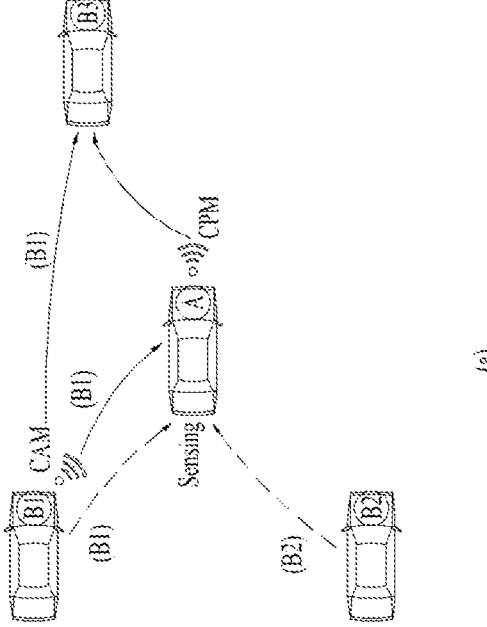

FIG. 14 is a diagram illustrating a method for constructing the CPM by the first ITS station.

FIG. 14(*a*) illustrates an exemplary situation (first situation) in which the distance between the first object (B1) and the first ITS station is equal to or less than a threshold distance and the CPM of the first objet (B1) is also received by the third object (B3). FIG. 14(*b*) illustrates an exemplary situation (second situation) in which the distance between the first object (B1) and the first ITS station is equal to or longer than a threshold distance and the CPM of the first object (B1) is not received by the third object (B3).

In the first configuration method shown in FIG. 3, the CPM may be configured to include information about the sensing object, regardless of whether the sensing object overlaps with the recognition object. Specifically, the first ITS station (A) may sense the first object (B1) and the second object (B2) using the sensor thereof, and may also obtain information about the first object (B1) through the CAM received from the first object (B1). In this case, the first ITS station (A) may configure the CPM in a manner that the information about the first ITS station, information about the first object, and information about the second object are included in the CPM.

In the first situation, the third object may obtain duplicate information about the first object not only through the CPM received from the first ITS station (A) but also through the CAM. Alternatively, in the second situation, the third object may obtain information about the first object (B1) through the CPM of the first ITS station (A). In this case, through the CPM, the CAM coverage of the first object can increase.

In the second configuration method shown in FIG. 13, the CPM may be configured in a manner that information about the overlapping object (when the sensing object is identical to the recognition object) is not included in the CPM. The first ITS station (A) may configure the CPM in a manner that information about the first object (B1) serving as the overlapping object obtained when the recognition object is identical to the sensing object is not included in the CPM, so that the configured CPM can be transmitted.

Specifically, the first object (B1) and the second object (B2) can be sensed by the sensor mounted to the first ITS station (A), and information of the first object (B1) can also be recognized or obtained through the CAM received from the first object (B1). In this case, the first ITS station (A) may be determined to be the overlapping object. The first ITS station (A) may configure the CPM in a manner that information about the first object (B1) is not included in the CPM. That is, the first ITS station may configure the CPM in a manner that information about the first ITS station (A) and information about the second object (B2) are included in the CPM.

For example, in the first situation, the first object (B3) can receive the CPM of the first object (B1), so that the third object can obtain information about the first object through the CAM of the first object even when information about the first object is not obtained from the CPM of the first ITS station (A). In contrast, in the second situation, the third object cannot obtain information about the first object from the CPM without receiving the CAM from the first object, so that the first object cannot be recognized.

In the second configuration method shown in FIG. 13, a method for determining whether to include information about the object (B) in the CPM by the first ITS station (A) based on the distance to the object (B) serving as the overlapping object.

Specifically, the first ITS station (A) may sense the first object (B1) and the second object (B2) using the sensor thereof, and may obtain information about the first object (B1) through the CAM received from the first object (B1). If the sensing object is determined to be the overlapping object overlapping the first object (B1) recognized by the reception CAM, the first ITS station (A) may determine whether to configure the CPM in a manner that information about the first object (B1) is included in the CPM based on the distance to the first object (B1).

If the distance between the first object (B1) and the first ITS station (A) is within a threshold distance, the first ITS station (A) may configure the CPM in a manner that information about the first object is not included in the CPM, and may transmit the configured CPM. That is, the first ITS station (A) may transmit the CPM in a manner that information about the first ITS station (A) and information about the second object are included in the CPM.

Alternatively, if the distance between the first object (B1) and the first ITS station (A) is equal to or longer than a threshold distance, the first ITS station (A) may configure the CPM in a manner that information about the first object serving as the overlapping object is included in the CPM, and may transmit the resultant CPM. That is, the first ITS station (A) may transmit the CPM in a manner that information about the first object, information about the second object, and information about the first ITS station are included in the CPM, and may transmit the resultant CPM.

For example, in the first situation, the first ITS station (A) may configure the CPM in a manner that information about the first object (B1) is not included in the CPM, and may transmit the resultant CPM. In other words, the first ITS station (A) may transmit the CPM including both object information of the first ITS information and information of the second object. In this case, the third object (B3) may obtain information about all objects not overlapping other objects, based on the CAM of the first object (B1) and the CPM of the first ITS station.

Alternatively, in the second situation (when the distance between the first object (B1) and the first ITS station (A) exceeds a threshold distance), the first ITS station (A) may configure the CPM in a manner that information about the overlapping object is included in the CPM. In this case, the CPM may include information about the first ITS station, information about the first object, and information about the second object. At this time, the third object (B3) may obtain information about the first ITS station, information about the first object (B1), and information about the second object (B2) through the CPM of the first ITS station (A) without receiving the CAM from the first object (B1).

Figure 15:
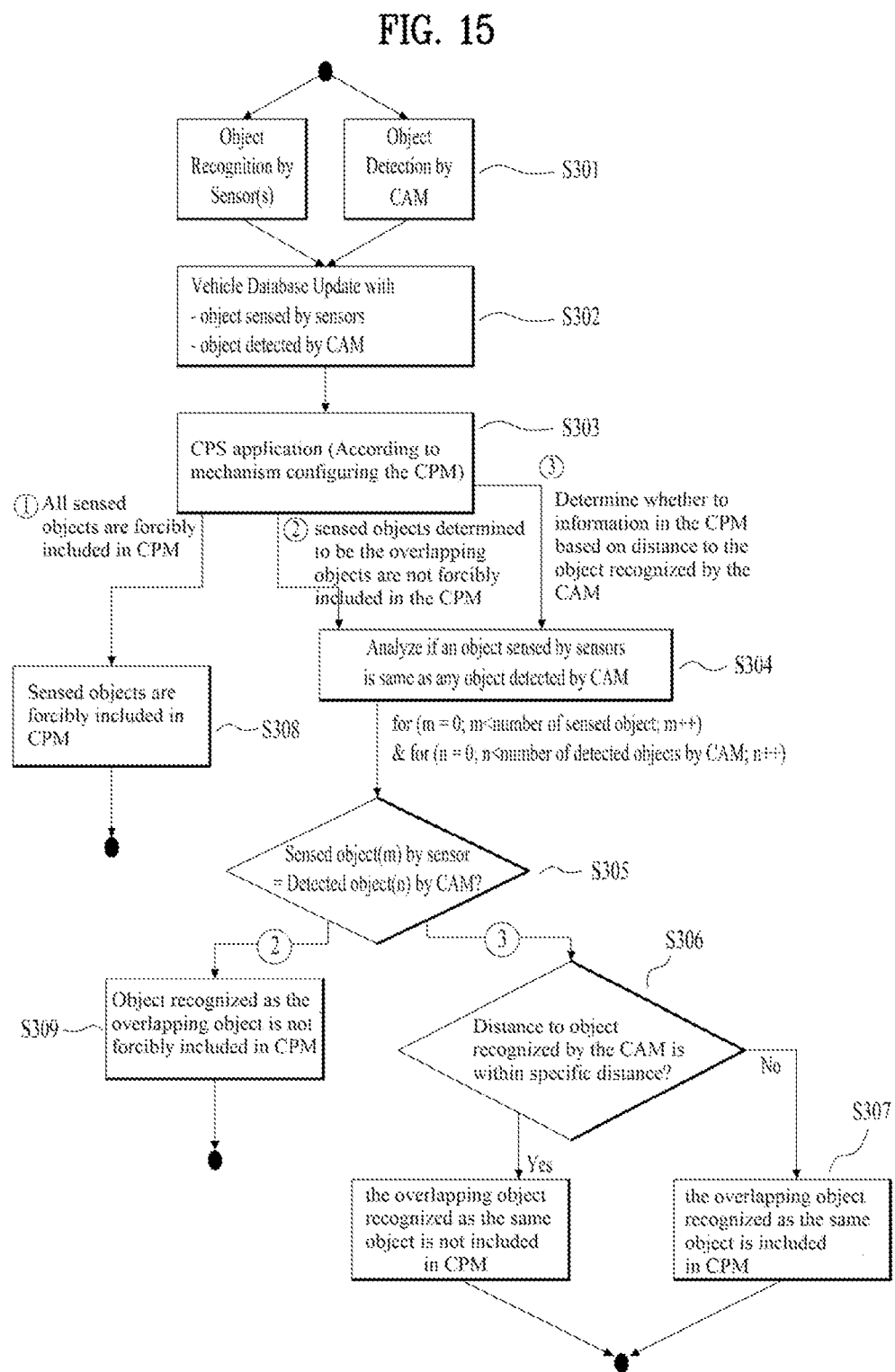
FIG. 15 is a flowchart illustrating a method for allowing the first ITS station to construct the CPM based on the received CAM and signals sensed by sensors.

FIG. 15 is a flowchart illustrating a method for allowing the first ITS station to configure the CPM based on the received CAM and signals sensed by sensors.

Referring to FIG. 15, the first ITS station may obtain information about the adjacent objects through the sensor, and may obtain information about the adjacent objects from the received CAM (or the received CAM) (S301). The first ITS station may update a database for the object upon receiving the information about the adjacent objects from the sensor and the received CAM (S302).

Next, the first ITS station may configure the CPM in various ways through the CPS application (S303). In the first case ① (or in the first configuration method), the first ITS station may forcibly include, in the CPM, information about the sensing object even when the sensing object is identical to the recognition object recognized by the reception CAM (S308). In the second case ② (or in the second configuration method), the first ITS station may configure the CPM in a manner that information about the sensing object it not included in the CPM, when the sensing object is identical to the recognition object received by the reception CAM. Alternatively, in the third case ③ (or in the third configuration method), the first ITS station may determine whether to configure the CPM in a manner that information about the overlapping object is included in the CPM based on the distance to the overlapping object.

In the second and third cases ② and ③, the first ITS station may determine whether the sensing object is the duplication object identical to the recognition object recognized by the reception CAM (S304). If the sensing object is determined to be the overlapping object (S305), the first ITS station may calculate the distance to the overlapping object in the third case ③, and may determine whether the calculated distance is equal to or less than a threshold distance (S306). If the calculated distance is equal to or less than the threshold distance, the first ITS station may configure or generate the CPM in a manner that information about the overlapping object is not included in the CPM. Alternatively, if the calculated distance exceeds the threshold distance, the first ITS station may configure or generate the CPM in a manner that information about the overlapping object is included in the CPM (S307).

For example, it can be assumed that the first ITS station obtains information of the first object, information of the second object, information of the third object, and information of the fourth object from the sensor, and then recognizes or obtains the second object from the received CAM. In this case, if the distance between the second object and the first ITS station is less than the threshold distance, the first ITS station may configure the CPM in a manner that information about the first object, information about the third object, information about the fourth object, and information about the first ITS station are included in the CPM. Alternatively, if the distance between the second object and the first ITS station exceeds the threshold distance, the first ITS station may configure the CPM in a manner that information about the first object, information about the second object, information about the third object, information about the fourth object, and information about the first ITS station are included in the CPM.

Alternatively, in the second case ②, the first ITS station may configure the CPM in a manner that information about the overlapping object is not included in the CPM (S309).

On the other hand, the first ITS station may determine whether or not the identity between the sensing object and the other object that is included not only in the CAM received from the other ITS stations (ITS-station) but also in the CPM is confirmed.

In other words, when information of the object (B) recognized by the sensor (e.g., camera, Lidar, Radar, etc.) is similar to information of the object (C) recognized by the CPM of the other ITS station (ITS-station), the first ITS station (A) may determine the object B to be the overlapping object.

A method for determining the presence or absence of identity between one object recognized by the reception CPM and the other object recognized by the sensor will hereinafter be described with reference to the attached drawings.

Figure 16:
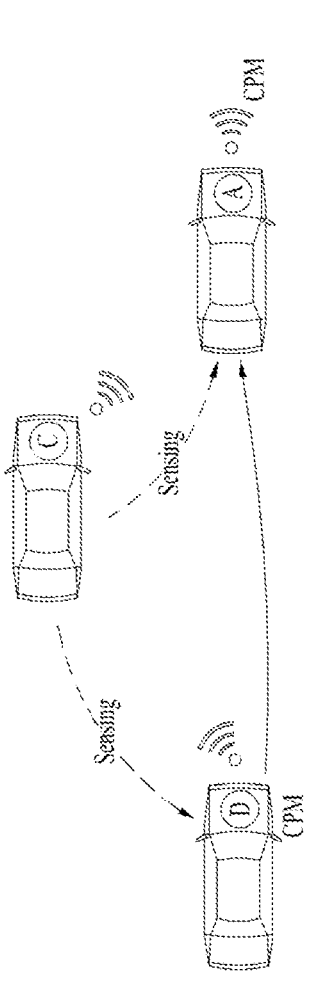
FIGS. 16 and 17 are diagrams illustrating examples of a method for allowing the first ITS station to configure the CPM based on the received CPM and signals sensed by sensors.
Figure 17:
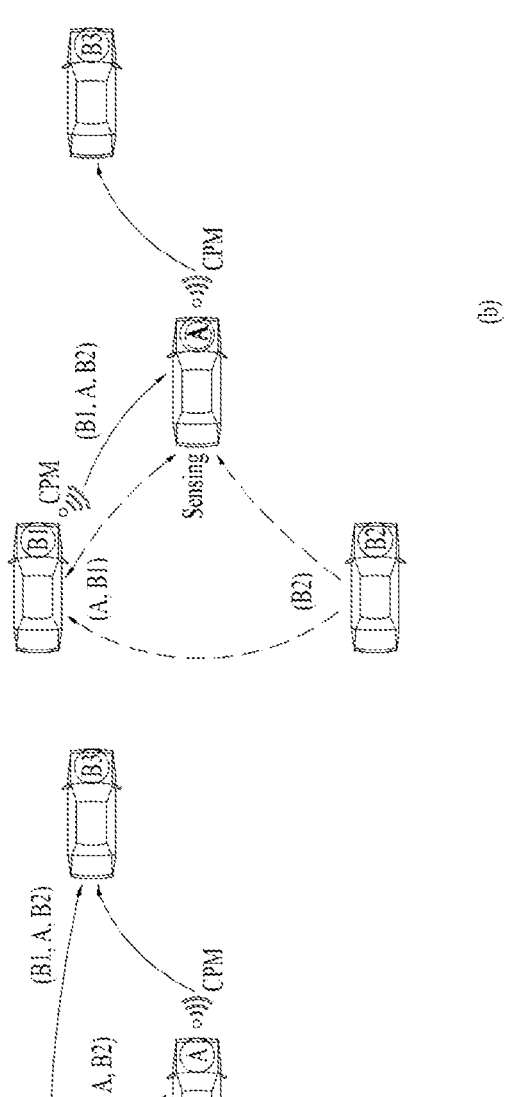

FIGS. 16 and 17 are diagrams illustrating examples of a method for allowing the first ITS station to configure the CPM based on the received CPM and signals sensed by sensors.

The first ITS station (A) may compare information of the received CPM with the sensing information, and may determine whether the sensing object (C) is identical to the object (B) recognized by the reception CPM according to the result of comparison. For example, the first ITS station (A) may obtain information about the type, size, motion, location, etc. of the object (or ITS station) from the reception CPM. In this case, when object information acquired from the reception CPM is identical to information (such as the type, size, motion, location, etc.) of the other object (or ITS station) recognized by the sensor or is identical to the information (such as the type, size, motion, location, etc.) of the other object (or ITS station) recognized by the sensor within a specific error range, the first ITS station (A) may determine the sensing object to be the overlapping object that is identical to the object recognized by the reception CPM.

Alternatively, the first ITS station (A) may determine whether one object (or the sensing object) sensed by the sensor is identical to the other object (or the recognition object) recognized by the reception CPM, by referring to only position information of such objects. For example, if a difference in position between the recognition object and the sensing object is within a predetermined distance of 1 m, the first ITS station (A) may determine the sensing object to be the overlapping object that is identical to the recognition object. Alternatively, although the sensing object is not identical to the recognition object, if the sensing object and the recognition object are located in a specific range, the first ITS station (A) may determine the sensing object to be the overlapping object that is identical to the recognition object.

Alternatively, referring to FIG. 16, as an example of the position comparison method, the first ITS station (A) may estimate the positions of the objects located at the same time point in consideration of a time difference between timestamp information of the reception CPM and the sensing time. Such estimation may be performed based on dynamics and/or kinetic information (or mobility information) included in the reception CPM. Specifically, the first ITS station (A) may estimate the position information of the recognition object at a time point where the sensing object is sensed, in consideration of timestamp information of the reception CPM and the sensing time point. In addition, the first ITS station (A) may compare the estimated position information of the recognition object with the position information of the sensing object, and may determine whether a difference in position information between the recognition object and the sensing object is within a predetermined error range.

For example, referring to FIG. 16, the first ITS stations (A) and the third ITS station (C)' may transmit the CPM including the sensed object information through the sensors thereof. For example, the first ITS station (A) may obtain 'generationDeltaTime' (e.g., 00:00:34 on August 1) from the reception CPM of the third ITS station (C), and may sense the first object (B1) at a specific time (e.g., 00:00:36 on August 1) through the sensor(s). In this case, upon receiving dynamics and kinetic information (or mobility information) (included in the reception CPM) related to the first object (B1) from the sensors, the first ITS station (A) may estimate where the first object (B1) that was located at a specific position (x1+xDITSance, y1+yDITSance, z1+zDITSance) before 2 seconds from the current time will be located after lapse of 2 seconds from the current time (at the same time point as the sensing time point), through the sensors. If a difference between the estimated position of the first object (B1) and the sensed position (x2, y2, z2) is within a specific error range, the first ITS station (A) may determine that the first object (B1) serving as the sensing object is the overlapping object that is identical to the first object (B1) recognized by the reception CPM.

If the sensing object (sensed by the sensor) is the overlapping object identical to the recognition object (recognized by the CPM), the first ITS station (A) may configure the CPM message using the following three methods.

In a first configuration method, the CPM may be configured to forcibly include information about the sensing object sensed by the sensor, regardless of whether the sensing object is the overlapping object. Specifically, the first ITS station (A) may sense the first object (B1) using the sensor thereof, may sense the second object (B2) using the sensor thereof, and may receive information about the first object (B1) through the reception CPM. In this case, the first ITS station (A) may configure the CPM in a manner that information about the first ITS station, information about the first object (B1), and information about the second object (B2) are included in the CPM.

In a second configuration method, the CPM may be configured not to include information about the overlapping object. If the first object (B1) sensed by the sensor is the overlapping object identical to the recognition object recognized by the reception CPM, the first ITS station (A) may configure the CPM not to include information about the first object (B1). In other words, the first ITS station 9A) may configure the CPM in a manner that object information of the first ITS station (A) and object information about the third ITS station are included in the CPM. In this case, whereas overlap between the object information of the CPM of the first object (B1) and the object information of the CPM of the first ITS station (A) can be eliminated, the adjacent ITS station (ITS-Station) not receiving the CPM of the first object (B1) cannot receive information about the first object (B1) using the CPM of the first ITS station.

In a third configuration method, information about whether information about the first object (B1) is included in the CPM may 1 be determined based on the distance between the first object (B1) serving as the overlapping object and the first ITS station. In more detail, the first ITS station (A) may sense the first object (B1) and the second object (B2) using the sensor thereof, and may recognize or identify the first object (B1) and the second object (B2) from the reception CPM. In this case, the first object serving as the sensing object is the same as the second object. In this case, the first ITS station (A) may determine whether to include information about the first object (B1) and information about the second object (B2) in the CPM thereof, based on the distance between the first ITS station (A) and the first object (B1).

Specifically, if the distance between the first object (B1) and the first ITS station (A) is within a threshold distance, the first ITS station (A) may transmit the CPM from which information about the first object (B1) and information about the second object (B2) are excluded. That is, the first ITS station (A) may configure the CPM including only information about the object thereof.

Alternatively, if the distance between the first object B1 and the first ITS station (A) is equal to or longer than the threshold distance, the first ITS station (A) may transmit the CPM that includes both information about the first object (B1) serving as the overlapping object and information about the second object (B2). That is, the first ITS station (A) may configure the CPM in a manner that information about the first object (B1), information about the second object (B2), and object information about the first ITS station (A) are included in the CPM.

FIG. 17(a) illustrates an exemplary situation (first situation) in which the distance between the first object (B1) and the first ITS station is equal to or less than a threshold distance and the CPM of the first object (B1) is also received by the third object (B3). FIG. 17(b) illustrates an exemplary situation (second situation) in which the distance between the first object (B1) and the first ITS station exceeds the threshold distance and the CPM of the first object (B1) is not received by the third object (B3).

In the first configuration method shown in FIG. 16, the first ITS station (A) may sense the first object (B1) and the second object (B2) using the sensor thereof, and may receive both information of the first object (B1) and information of the second object (B2) through the CPM received from the first object (B1). The first ITS station (A) may repeatedly obtain information of the first object (B1) and information of the second object (B2) using each of the reception CPM and the sensor, and may determine each of the first object (B1) and the second object (B2) to be the overlapping object. In the first configuration method, information about all objects repeatedly recognized by the CPM and the sensor may be forcibly included in the CPM, the first ITS station may include information of the first object (B1) and information of the second object (B2) in the CPM, and may transmit the resultant CPM. That is, the first ITS station may configure the CPM in a manner that object information of the first ITS station, information of the first object (B1), and information of the second object (B2) are included in the CPM, and may transmit the resultant CPM.

For example, in the first situation, the third object (B3) may receive information about the first object (B1) and information about the second object (B2) overlapping the first object (B1) through the received CPM of the first object B1 and the CPM of the first ITS station. Alternatively, in the second situation, the third object (B2) may receive only the CPM of the first ITS station, and may obtain information of the first object (B1) and information of the second object (B2) through the CPM of the first ITS station (A). In this case, coverage of the CPM of the first object (B1) and coverage of the CPM of the second object (B2) can increase.

In the second configuration method shown in FIG. 16, the first ITS station (A) may sense the first object (B1) and the second object (B2) using the sensor thereof, and may receive information of the first object (B1) and information of the second object (B2) from the first object (B1) through the CPM. The first ITS station (A) may repeatedly obtain information of the first object (B1) and information of the second object (B2) from each of the reception CPM and the sensor, and may determine the first object (B1) and the second object (B2) to be the overlapping objects. In this case, when the first object (B1) and the second object (B2) are recognized to be the same objects, their information is not forcibly included in the CPM, so that the first ITS station (A) may not include information of the first object (B1) and information of the second object (B2) in the CPM of the first ITS station (A). That is, the first ITS station (A) may configure the CPM in a manner that only object information of the first ITS station (A) is included in the CPM, and may transmit the resultant CPM.

For example, in the first situation, since the third object (B3) can receive the CPM from the first object (B1), information of the first object and information of the second object can be obtained from the CPM of the first object (B1). Alternatively, in the second situation, since the third object (B3) cannot receive the CPM of the first object (B1), the third object (B3) cannot receive information of the first object (B1) and information of the second object (B2) even when receiving the CPM from the first ITS station (A).

In the third configuration method shown in FIG. 16, the first ITS station (A) can sense the first object (B1) and the second object (B2) using the sensor thereof, and may receive information of the first object (B1) and information of the second object (B2) from the first object (B1) through the CPM. The first ITS station (A) may repeatedly obtain information of the first and second objects B1 and B2 from each of the reception CPM and the sensor, and may determine the first object (B1) and the second object (B2) to be the overlapping objects. In this case, the first ITS station (A) may determine whether to include information of the first and second objects B1 and B2 corresponding to the overlapping objects in the CPM, based on the distance between the first object B1 and the first ITS station (A).

For example, in the first situation, since the distance between the first ITS station and the first object is less than a threshold distance, the first ITS station (A) may not include, in the CPM, information of the first object (B1) and the second object (B2) corresponding to the overlapping objects. That is, the first ITS station (A) may configure the CPM including only object information thereof, and may transmit the resultant CPM. In this case, the third object (B3) cannot obtain not-overlapping object information from the CPM of the first object (B1) and the CPM of the first ITS station (A).

Alternatively, in the second situation, since the distance between the first ITS station and the first object is equal to or longer than a threshold distance, the first ITS station (A) may include information of the first and second objects B1 and B2 in the CPM thereof. That is, the first ITS station (A) may configure the CPM in a manner that information of the first object (B1), information of the second object (B2), and the object information of the first ITS station (A) are included in the CPM, and may transmit the resultant CPM. In this case, the third object (B3) may also obtain information of the first and second objects from the CPM of the first ITS station (A) without receiving the CPM of the first object (B1).

Figure 18:
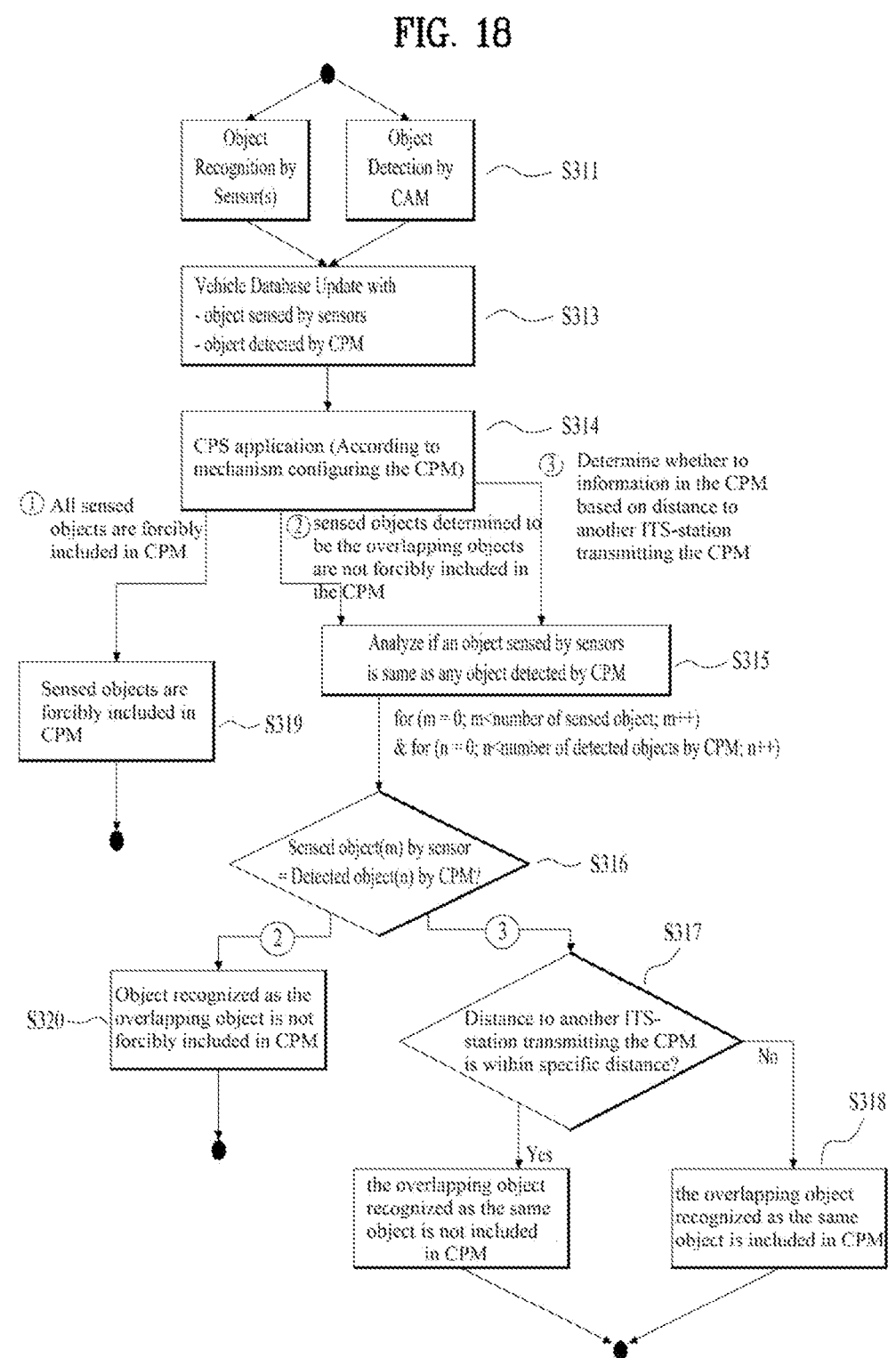
FIG. 18 is a flowchart illustrating a method for allowing the first ITS station to configure the CPM when an overlapping object is sensed based on the received CPM and signals sensed by sensors.

FIG. 18 is a flowchart illustrating a method for allowing the first ITS station to configure the CPM when the overlapping object is sensed based on the received CPM and signals sensed by sensors.

Referring to FIG. 18, the first ITS station may sense the object using the sensor (e.g., a camera, Lidar, Radar, etc.), and may recognize the object based on the reception CPM (or the CPM received from another object or another ITS station) (S311). The first ITS station may update a database related to the object, based on information of the sensing object sensed by the sensor (e.g., a camera, Lidar, Radar, etc.) and information of the recognition object recognized through the received CPM (or CAM) (S313).

Next, the first ITS station may configure the CPM based on the CPS application (S314). The CPM configuration method may be changed depending on how to handle the overlapping object confirmed when the sensing object is identical to the recognition object recognized by the reception CPM. Here, the method for determining the presence or absence of the overlapping object may include, when the degree of identity between object information of the sensing object and object information of the recognition object is equal to or greater than a predetermined reference value, determining the sensing object to be the overlapping object identical to the recognition object.

In more detail, in the case ①, the first ITS station may configure the CPM in a manner that information about the overlapping object is forcibly included in the CPM (S319). In the case ②, the first ITS station may configure the CPM in a manner that information about the overlapping object is not included in the CPM. Alternatively, in the case ③, the first ITS station may determine whether to configure the CPM including information about the overlapping object, based on the distance between the first ITS station and the overlapping object.

In the above-described cases ② and ③, when the degree of identity between the sensing object and the recognition object is equal to or higher than a predetermined reference value, the sensing object can be determined to be the overlapping object identical to the recognition object (S315). For example, if the degree of the identity between the type, position, and/or mobility information of the object included in the CPM and the type, position and/or mobility information of the object sensed by the sensor is equal to or higher than a predetermined ratio, if a difference in between the object position included in the CPM and the object position of the object sensed by the sensor is within a predetermined error range, and/or if a difference between the estimated object position (that is obtained when the object estimates the position of the object at the same time point as the sensing time where the object is sensed) and the position of the sensing object is within a predetermined error range, the first ITS station may determine the sensing object to be the overlapping object identical to the recognition object.

If the sensing objet is determined to be the overlapping object identical to the recognition object recognized by the reception CPM, the first ITS station may configure the CPM configuration method in different ways according to the above cases ② and ③ (S316).

In the second case ②, the first ITS station may configure the CPM in a manner that information about the overlapping object is not included in the CPM (S320). In this case, the first ITS station may exclude information about the overlapping object from the CPM, so that the amount of object information included in the CPM can be efficiently reduced.

In the third case ③, the first ITS station may determine whether to construct the CPM including information about the overlapping object, based on the distance between the first ITS station and the overlapping object (S317). If the distance between the first ITS station and the overlapping object is equal to or less than a threshold distance, the first ITS station may configure the CPM in a manner that information about the overlapping object is not included in the CPM (S318). Alternatively, when the distance between the first ITS station and the overlapping object exceeds the threshold distance, the first ITS station may configure the CPM in a manner that information about the overlapping object is included in the CPM.

In other words, if the reception CPM is highly likely received by the adjacent ITS station (when the distance between the first ITS station and the overlapping object is less than the threshold distance), the first ITS station may configure the CPM in a manner that information about the overlapping object is not included in the CPM, and the overlapping object information can be prevented from being transferred to the adjacent ITS station, so that the amount of CPM information can be minimized and the amount of unnecessary network traffic increase can be minimized. Alternatively, if the reception CPM is less likely received by the adjacent ITS station (when the distance between the first ITS station and the overlapping object is equal to or longer than the threshold distance), the first ITS station may configure the CPM in a manner that information about the overlapping object is included in the CPM, so that coverage of the reception CPM related to the overlapping object can increase.

Figure 19:
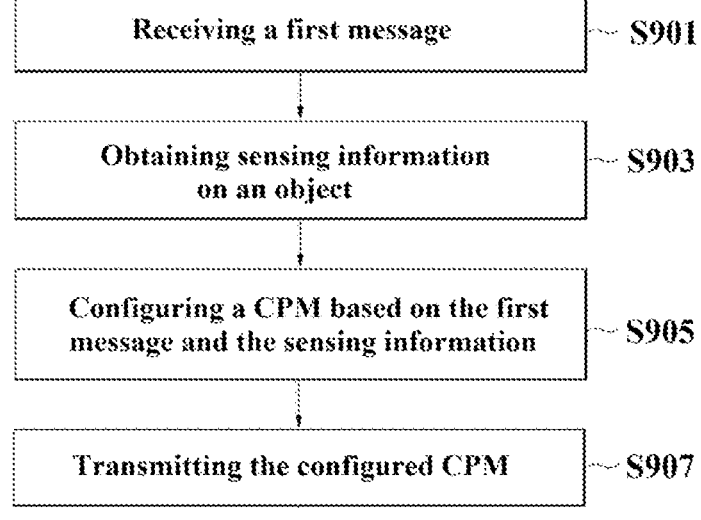
FIG. 19 is a flowchart illustrating a method for allowing the first device to construct the CPM based on the sensing information and the received message.

FIG. 19 is a flowchart illustrating a method for allowing the first device to construct the CPM based on the sensing information and the received message.

In FIG. 19, the first device may correspond to the above-described ITS station, and the second device may correspond to the ITS station or the object capable of transmitting the CAM or the CPM to the first device. In addition, the message may correspond to the CAM or the CPM.

Referring to FIG. 19, the first device may receive, from the second device, the first message (CAM and/or CPM) including information about at least one object (S901). The first message may refer to the CAM that includes mobility information, identification (ID) information and/or position information of the second device, and/or may refer to the CPM that includes information about the adjacent objects sensed by the sensor of the second device.

The first device may obtain sensing information that includes information about the adjacent objects, through the sensor (S903). The sensing information may include at least one of mobility information, position information, object size information, and object type information of each of the adjacent objects. On the other hand, the sensing information may include the sensed object information within the determined angle range, based on the movement direction of the first device. For example, the sensing information may include object information about the rear side of the first device.

The first device may configure the CPM to be transmitted to each of the adjacent object or the ITS station, based on the sensing information and the object information included in the first message (S905). Specifically, among the plurality of object information included in the sensing information, the first device may determine the presence or absence of at least one overlapping object that is identical to the object information (or the first object information) included in the first message. If the presence of the determined overlapping object is decided, the first device may determine whether to include information about the overlapping object in the CPM based on both the distance to the second device and the threshold distance.

In more detail, if the distance to the second device is equal to or less than the threshold distance, the first device may configure the CPM in a manner that information about the overlapping object is not included in the CPM. For example, among the plurality of object information included in the sensing information, the first device may configure the CPM that includes both the object information about the first device and the remaining object information other than the information of the overlapping object. Alternatively, if the distance to the second device is equal to or longer than (exceeds) the threshold distance, the first device may configure the CPM in a manner that information about the overlapping object is included in the CPM. For example, the first device may configure the CPM that includes both object information (further including information about the overlapping object) included in the sensing information and information about the first device.

Alternatively, the first device may compare the type, size, position, and mobility information of the object based on the sensing information with the type, size, position, and mobility information of the object obtained from the first message, and may determine whether the sensing object is the overlapping object identical to the object obtained by the first message.

Alternatively, information as to whether object information overlapping the object information included in the first message is included in the sensing information may be determined based on the first position of the sensing object and the second position of the object recognized by the first message. For example, when the first position is within the predetermined error range from the second position, the sensing object and the recognition object can be determined to be the overlapping objects. Alternatively, the second position may be estimated to be the position at the second time, based on a time difference between the sensing time (i.e., the second time) where the object is sensed through the sensor and the time information (i.e., the first time) related to the first message. For example, the first device may obtain, from the first message, time information indicating which one of the time points (first time) is associated with object information included in the first message. If the second time is different from the first time, the first device may estimate where the object will be located at the second time, based on mobility information of the object obtained from the first message. In this case, the first device may compare the estimated position with the position of the sensed object, and may determine whether the first device is located within the error range. In this case, the first time may also be obtained from timestamp information included in the first message.

Alternatively, the threshold distance may be pre-configured in consideration of the coverage of the CPM or the CAM of the second device or the first device. For example, when the coverage of the CPM or the CAM is set to N m, the threshold distance may be pre-configured to be N/2 m. As a result, overlap transmission of the overlapping object information through the CPM can be prevented, and the coverage increase of the CPM or CAM of the second device can be efficiently achieved.

Alternatively, the preconfigure threshold distance may be determined based on the sensing distance of the sensor mounted to the first device. For example, if the sensing distance of the sensor mounted to the first device is set to K m, the preconfigured threshold distance may be set to K m or less.

Alternatively, the preconfigured threshold distance may be adjusted based on the moving speed of the first device and the moving speed of the second device. For example, in order to further increase the coverage of the CPM or CAM of the second device when the moving speed of the first device is faster than the moving speed of the second device, the preconfigured threshold distance can be shortened. When the moving speed of the second device is faster than the moving speed of the first device, the preconfigured threshold distance can increase to reduce the probability that the overlapping object information is included in the CPM of the first device.

Next, the first device may transmit the configured CPM to the adjacent object or the adjacent ITS stations (S907).

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
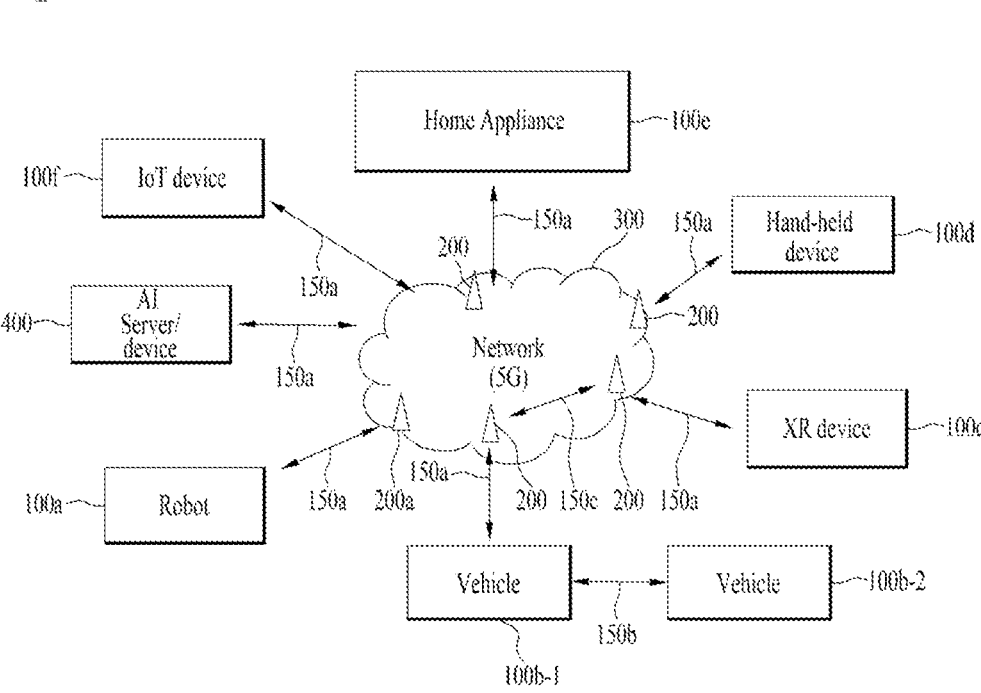
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
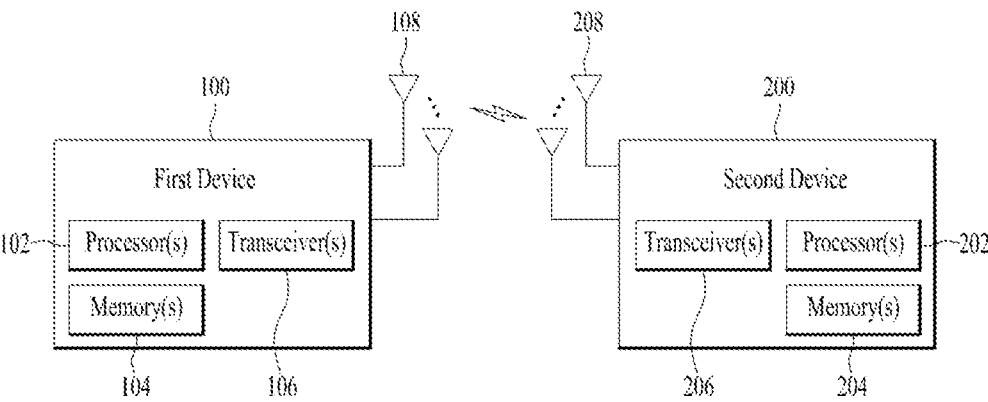
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a processor 102 and a memory 104 that are connected to the RF transceiver. The memory 104 may include at least one program capable of performing the operation related to the embodiments shown in FIGS. 10 to 19.

The processor 102 may receive a first message from the second device by controlling the RF transceiver, may obtain sensing information about the adjacent objects, may determine whether object information overlapping the first object information obtained from the first message is included in the sensing information, may determine whether to include the overlapping object information in the CPM by referring to the distance to the second device, and may transmit the CPM based on the sensing information by controlling the RF transceiver. The processor 102 may configure the CPM according to the embodiments in which the CPM shown in FIGS. 10 to 19 is constructed based on the program stored in the memory 104, and may transmit the configured CPM.

Alternatively, the chip set including the processor 102 and the memory 104 may be configured. In this case, the chip set may include at least one processor, and at least one memory operatively connected to the at least one processor and configured to store instructions such that the at least one processor performs specific operations by executing the instructions. The specific operations may include receiving a first message from the second device, obtaining sensing information about the adjacent objects, determining whether object information overlapping the first object information obtained from the first message is included in the sensing information, determining whether to include the overlapping object information in the CPM by referring to the distance to the second device, and transmitting the CPM based on the sensing information by controlling the RF transceiver. The processor 102 may configure the CPM according to the embodiments in which the CPM shown in FIGS. 10 to 19 is constructed based on the program stored in the memory 104, and may transmit the configured CPM.

Alternatively, a computer-readable storage medium is configured to store at least one computer program including instructions such that at least one processor performs specific operations by executing the instructions. The specific operations may include receiving a first message from the second device by controlling the RF transceiver, obtaining sensing information about the adjacent objects, determining whether object information overlapping the first object information obtained from the first message is included in the sensing information, determining whether to include the overlapping object information in the CPM by referring to the distance to the second device, and transmitting the CPM based on the sensing information by controlling the RF transceiver. The above operations may configure the CPM according to the embodiments in which the CPM shown in FIGS. 10 to 19 is constructed based on the program stored in the memory 104, and may transmit the configured CPM, based on the program stored in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
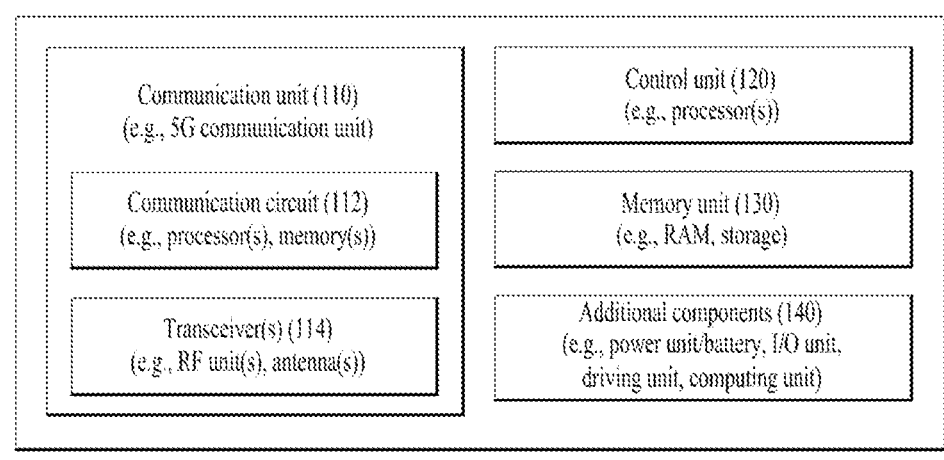
FIG. 22 illustrates another example of a wireless device to which the present disclosure is applied.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
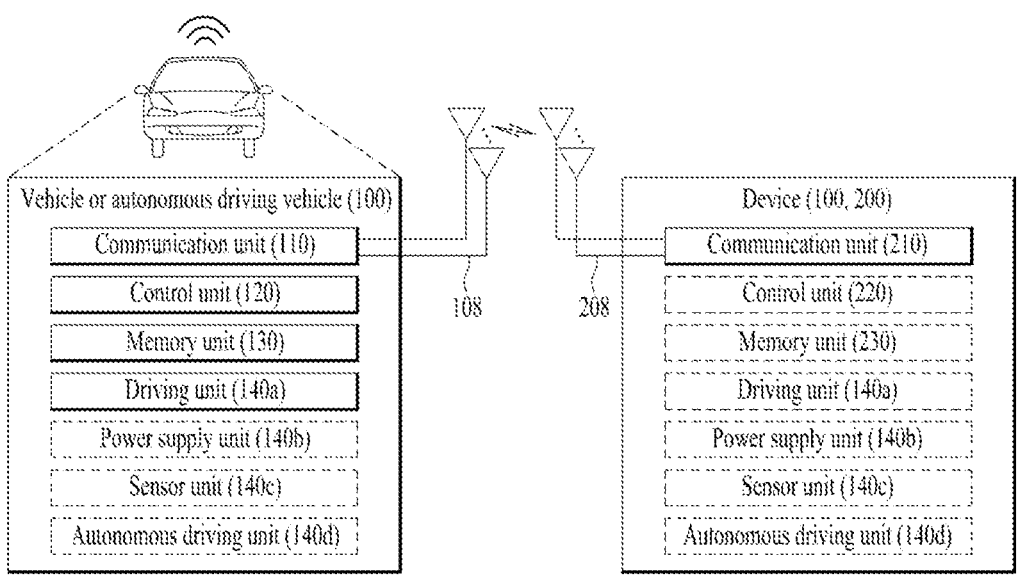
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method performed by a first device comprising:
receiving, from a second device, a first message including object information for a first object;
obtaining sensing information for adjacent objects;
determining a second object that overlaps the first object among the adjacent objects;
excluding the second object that overlaps the first object among the adjacent objects from the sensing information based on a distance between the first device and the second device being less than a threshold distance; and
transmitting a collective perception message (CPM) including the sensing information for remaining objects excluding the second object,
wherein the threshold distance is adjusted based on a speed of the first device and a speed of the second device,
wherein, based on the speed of the first device being faster than the speed of the second device, the threshold distance is adjusted to be shorter, and
wherein, based on the speed of the first device being slower than the speed of the second device, the threshold distance is adjusted to be longer.

2. The method according to claim 1, wherein, based on the distance exceeding the threshold distance, the CPM includes the sensing information for all of the adjacent objects.

3. The method according to claim 1, wherein an initial value of the threshold distance is pre-configured based on a coverage of the first message.

4. The method according to claim 1, wherein the second object is an object located within a predetermined error distance from a position of the first object among the adjacent objects.

5. The method according to claim 4, wherein the position of the first object is estimated, based on mobility information obtained from the first message and a difference between a first time obtained from the first message and a second time where the sensing information is obtained.

6. The method according to claim 5, wherein the first time is obtained based on a timestamp included in the first message.

7. The method according to claim 1, wherein the first message is a cooperative awareness message (CAM) received from the second device or is the CPM.

8. The method according to claim 1, wherein the object information is information about either a vehicle or an intelligent transport system (ITS) station.

9. A first device comprising:
a memory storing instructions;
a radio frequency (RF) transceiver; and
a processor connected to the RF transceiver and the memory,
wherein the processor is configured to execute the instructions to perform operations comprising:
receiving, from a second device, a first message including object information for a first object by controlling the RF transceiver;
obtaining sensing information for adjacent objects;
determining a second object that overlaps the first object among the adjacent objects;
excluding the second object that overlaps the first object among the adjacent objects from the sensing information based on a distance between the first device and the second device being less than a threshold distance; and
transmitting a collective perception message (CPM) including the sensing information for remaining objects excluding the second object by controlling the RF transceiver,
wherein the threshold distance is adjusted based on a speed of the first device and a speed of the second device,
wherein, based on the speed of the first device being faster than the speed of the second device, the threshold distance is adjusted to be shorter, and
wherein, based on the speed of the first device being slower than the speed of the second device, the threshold distance is adjusted to be longer.

10. A chip set comprising:
at least one processor; and
at least one memory operatively connected to the at least one processor, and configured to store instructions such that the at least one processor performs specific operations by executing the instructions,
wherein the specific operations include:
receiving, from a second device, a first message including object information for a first object,
obtaining sensing information for adjacent objects,
determining a second object that overlaps the first object among the adjacent objects,
excluding the second object that overlaps the first object among the adjacent objects from the sensing information based on a distance between a first device and the second device being less than a threshold distance, and
transmitting a collective perception message (CPM) including the sensing information for remaining objects excluding the second object,
wherein the threshold distance is adjusted based on a speed of the first device and a speed of the second device,
wherein, based on the speed of the first device being faster than the speed of the second device, the threshold distance is adjusted to be shorter, and
wherein, based on the speed of the first device being slower than the speed of the second device, the threshold distance is adjusted to be longer.

* * * * *